United States Patent
Chiu et al.

(10) Patent No.: US 7,509,444 B2
(45) Date of Patent: Mar. 24, 2009

(54) DATA ACCESS DEVICE FOR WORKING WITH A COMPUTER OF POWER OFF STATUS

(75) Inventors: Chih-Yang Chiu, Taipei (TW); Ching-Chin Huang, Jhudong Township, Hsinchu County (TW); Teng-Chieh Yang, Pingtung (TW); Tsahn-Yih Chang, Hsinchu (TW); Yang-Chih Huang, Jhongli (TW); Li-Hao Hsiao, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 365 days.

(21) Appl. No.: 11/225,030

(22) Filed: Sep. 14, 2005

(65) Prior Publication Data

US 2006/0224801 A1   Oct. 5, 2006

(30) Foreign Application Priority Data

Mar. 29, 2005   (TW) .............................. 94109773 A

(51) Int. Cl.
    *G05B 13/00*      (2006.01)
(52) U.S. Cl. ............................. 710/51; 710/38; 710/64; 710/316; 713/300
(58) Field of Classification Search ................ 710/70, 710/14, 36, 74, 62, 315; 707/1; 711/163; 361/685
    See application file for complete search history.

(56) References Cited

U.S. PATENT DOCUMENTS

| | | | |
|---|---|---|---|
| 6,226,237 B1 * | 5/2001 | Chan et al. | 710/14 |
| 6,675,233 B1 * | 1/2004 | Du et al. | 710/14 |
| 6,766,462 B2 * | 7/2004 | Hung | 713/330 |
| 6,859,854 B2 * | 2/2005 | Kwong | 710/315 |
| 6,894,892 B2 * | 5/2005 | Wang | 361/679 |
| 6,954,804 B2 * | 10/2005 | Lam et al. | 710/14 |
| 7,203,777 B2 * | 4/2007 | Morita et al. | 710/74 |
| 2003/0233499 A1 * | 12/2003 | Choi | 710/36 |
| 2005/0216685 A1 * | 9/2005 | Heden et al. | 711/163 |

OTHER PUBLICATIONS

Texas Instruments, Autoswitch Power Multiplexer, Texas Instruments, 2004, pp. 1-20.*

* cited by examiner

*Primary Examiner*—Henry W. H. Tsai
*Assistant Examiner*—Cheng-Yuan Tseng
(74) *Attorney, Agent, or Firm*—Bacon & Thomas, PLLC

(57) ABSTRACT

This invention discloses a data access device for using in computer of power off status, which comprises a power multiplexer, a DC to DC converter, a serial bus signal to storage interface signal controller, a data storage interface signal multiplexer, and a controller. Therefore, if controller detects an external device wants to access data storage device of computer at power off, it will control power multiplexer to retrieve the standby power of the power device and process power transformation to provide a required power for driving the storage device, and by using serial bus signal to storage interface signal controller, external device can access the data from storage device at power off.

12 Claims, 3 Drawing Sheets

DATA ACCESS DEVICE FOR WORKING WITH A COMPUTER OF POWER OFF STATUS

BACKGROUND OF THE INVENTION

1. Field of the Invention

The present invention relates to a data access device which can access the data storage device of computer of power off status.

2. Description of Related Art

With the development of electronic technology, the functionalities of portable devices keep increasing, and the sizes of electronic devices become smaller, for example, portable multimedia players (PMP), notebooks, PALM™, personal digital assistants (PDA), camera phones etc. Due to their portability and powerful operation capability, such kinds of small electronic devices provide obvious convenience to users. Further, because most portable devices are capable of being connected to the computer host so as to perform data exchange, the function of the computer host has been gradually transformed to be a data exchange center.

Conventionally, when a computer is at power off, an external device would fail to perform data transmission to the computer unless turning on its power. However, since a large amount of software programs have been installed in the hard drive of the computer, it should take a long period of time to execute these software programs during the boot procedure. Consequently, the user is not allowed to perform data transmission to the hard disk drive of the computer until all software programs are completed in execution. Moreover, the longer the user uses the computer, the more software programs are installed. As a result, the time period of executing software programs may gradually extend by time, thereby causing inconvenience to the user and also increasing power consumption during the boot procedure.

Therefore, it is desirable to provide a data access device for using in computer of power off status to mitigate and/or obviate the aforementioned problems.

SUMMARY OF THE INVENTION

The object of the present invention is to provide a data access device to support the external device to access the data storage device of the computer while the computer is at power off.

To achieve the object of the present invention, the present invention relates to a data access device for working with a computer of power off status, wherein the computer comprises a power supply device, a motherboard, and a data storage device; while the data access device of the present invention comprises: a power multiplexer, for establishing power channels according to a control signal to supply power to the data access device; a DC to DC converter for converting standby power provided by the power supply device and applying the converted power to the data storage device via a power multiplexer; a serial bus signal to storage interface signal controller, for converting a storage interface signal of the data storage device into a serial bus signal, or converting a serial bus signal inputted from an external device into the storage interface signal of the data storage device; a data storage interface signal multiplexer, for establishing a data transmitting channel according to the control signal, so as to select the motherboard or external device to access the data storage device 13; and a path controller electrically connected to the power supply device, the power multiplexer, the serial bus signal to storage interface signal controller, and the data storage interface signal multiplexer. When the computer is at power off, the power multiplexer switch the power path to let the power come from the DC to DC converter and then to supply power to the data storage device if the external device attempts to access the data storage device. The serial bus signal to storage interface signal controller converts a storage interface signal of the data storage device into a serial bus signal, or converts the serial bus signal into the storage interface signal of the data storage device. The data storage interface signal multiplexer is used to switch the data storage signal path for the serial bus signal to storage interface signal controller or motherboard according to the control signal. When the computer is at power on, the data storage device is connected to the motherboard; when the computer is at power off, the data storage device is connected to the serial bus signal to storage interface signal controller. The path controller checks the computer status and controls the operations of other circuits. By detecting the status of the serial bus signal to storage interface signal controller or the serial bus signal, it is capable of determining whether the external is plugged in or not, while the power good signal or power of the power supply device is capable of determining if the computer is at power on or not. According to the commands from these signals, the path controller submits control signals to the power multiplexer and the data storage interface signal multiplexer so as to perform appropriate signal and power channel switching among the data storage device, the motherboard, and the external device. As a result, the data access device of the present invention is adapted to the existing computer structure, and allows the external device to access the data storage device when the computer is at power off without waiting till the boot procedure is completed, thereby not only saving the waiting time, but also reducing the unnecessary power consumption caused by the boot procedure.

Furthermore, the data access device of the present invention can also be embedded in the motherboard of the computer for increasing the internal space of the computer case and reducing the hardware cost, thereby obviously increasing the operating convenience.

The aforementioned external serial signal is provided by an external device, which is preferably a portable digital device, such as a portable multimedia player (PMP), notebook, PALM™, personal digital assistant (PDA), camera phones, or the like. The aforesaid data storage device is preferably a hard disk drive (HDD), or other equivalent data storage devices, such as a CD-ROM drive or the like. The aforesaid serial bus signal to storage interface signal controller is preferably a universal serial bus (USB) to storage interface signal controller, or other equivalent serial bus signal to storage interface signal controller, such as IEEE 1394 interface or the like. The aforesaid storage interface signal of the data storage device is preferably an IDE interface signal, or other equivalent transport interface signals, such as the SCSI interface signal, the serial IDE interface signal, the CompactFlash interface signal, or the like.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
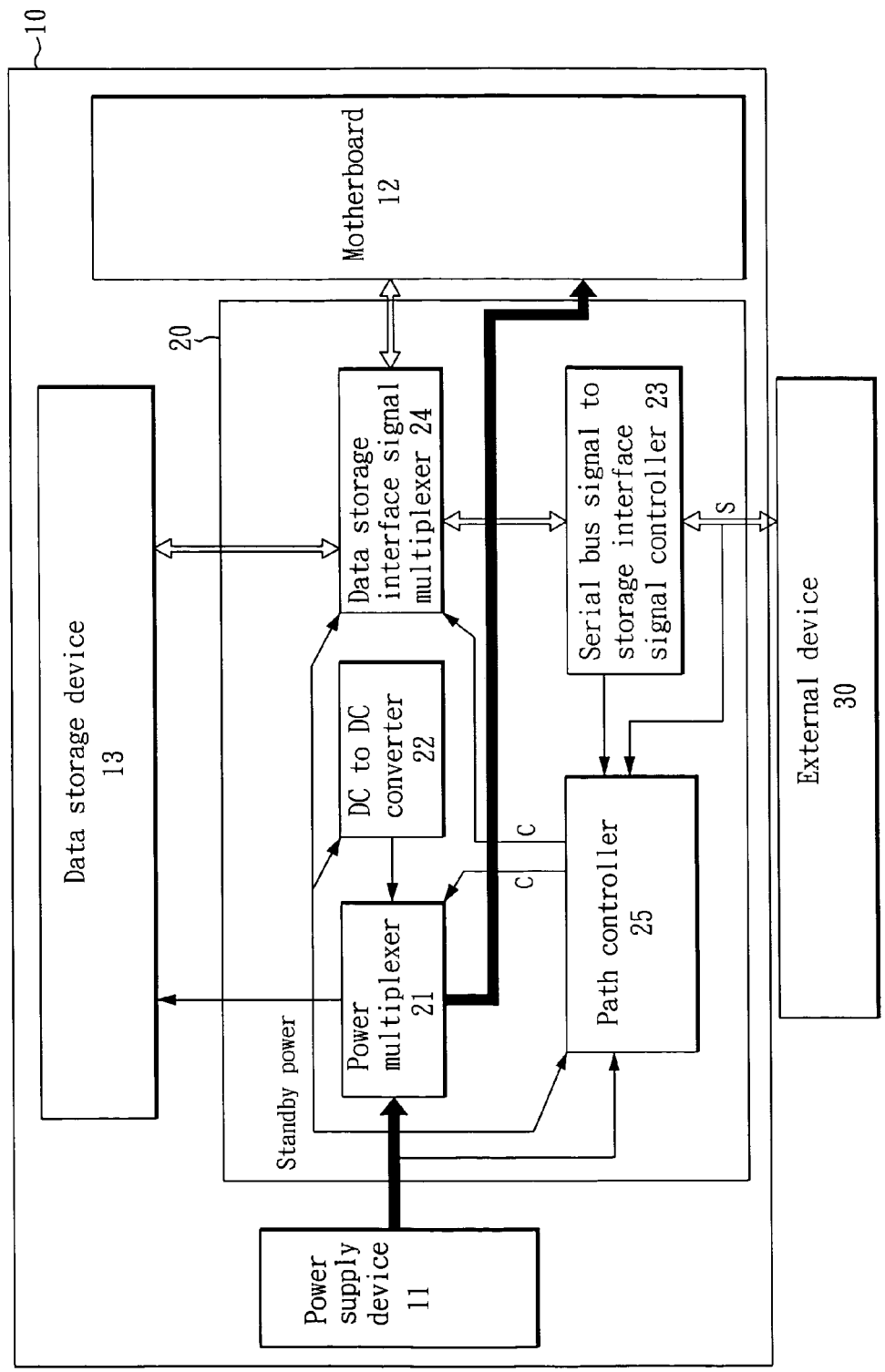
FIG. 1 illustrates a block diagram of one preferred embodiment according to the present invention.
Figure 2:
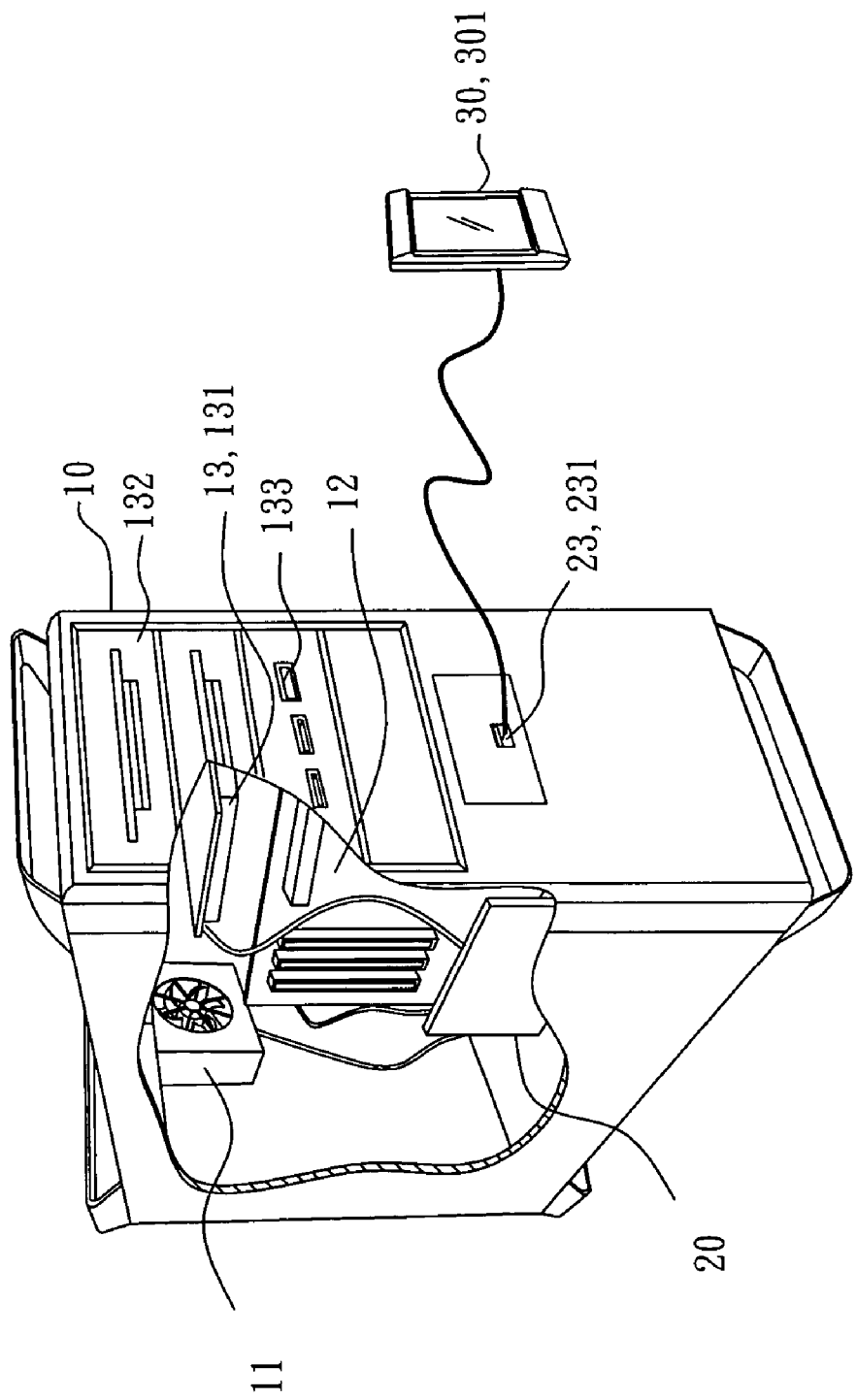
FIG. 2 illustrates a perspective view of the preferred embodiment according to the present invention.

Please refer to FIGS. 1 and 2. FIG. 1 illustrates the block diagram of a preferred embodiment according to the present invention; and FIG. 2 illustrates a perspective view of the preferred embodiment according to the present invention. As shown in FIG. 1, the data access device 20 of the present invention is operated with a computer 10. The computer 10 comprises a power supply device 11, a motherboard 12, and a data storage device 13. In the embodiment, the power supply device 11 is an ATX power supply. The data storage device 13 is preferably a hard disk drive 131, or it can be a CD-ROM drive 132, a compact flash memory 133, or other equivalent storage device. Further, the data storage device 13 preferably performs IDE interface signal transmission via the IDE interface in this embodiment. Please note that the storage interface signal of the data storage device 13 can also be the SCSI interface signal, the Serial IDE interface signal, or the CompactFlash interface signal. The data access device 20 of the embodiment comprises a power multiplexer 21, a DC to DC converter 22, a serial bus signal to storage interface signal controller 23, a data storage interface signal multiplexer 24, and a path controller 25.

The present invention allows data access when the computer 10 is at power off without booting. Consequently, the data access device 20 uses power good signal or power status to check whether the computer 10 is at power on or not.

Moreover, when the computer 10 is at power off, the path controller 25 is used to detect whether an external serial bus signal S is inputted to the serial bus signal to storage interface signal controller 23. In this embodiment, the serial bus signal to storage interface signal controller 23 is an USB-to-IDE bridge controller. Therefore, if the path controller 25 received a signal notification from the USB-to-IDE Bridge controller regarding that a serial bus signal S is inputted externally, it indicates that an external device 30 is connected to the USB connector 231. In this embodiment, the external device 30 is a portable multimedia player (PMP) 301. As a result, when the path controller 25 detects that the external device 30 will access the data storage device 13 in the computer 10 via the USB connector 231, the path controller 25 then submits a control signal C to the power multiplexer 21 and the data storage interface signal multiplexer 24 to provide a required power to the hard disk drive 131 and a data path to perform data transmission.

Further, the power supply device 11 will keep on providing the standby power to the data access device 20 under the computer in power off status. When the power multiplexer 21 receives the control signal C from the path controller 25 for external device 30 accessing, it will give the power channel to the power which come from DC to DC converter 22, and transmits this power to the hard disk drive 131. In this embodiment, only when the computer 10 is at power off and the external device 30 attempts to perform data access to the hard disk drive 131, the power multiplexer 21 gives the power channel to the power which come from DC to DC converter 22 for providing the required power to the hard drive 131. On the contrary, if no external device 30 attempts to access the hard drive 131, the computer 10 still can perform normal boot procedure because the motherboard 12 is fully connected to the power supply device 11 via the power multiplexer 21.

Moreover, when the data storage interface signal multiplexer 24 receives the control signal C from the path controller 25, wherein the control signal C indicates that the external device 30 attempts to perform data access to the hard disk drive 131, the data storage interface signal multiplexer 24 transforms the signal channel to the serial bus signal to storage interface signal controller 23. Then, the data of the hard disk drive 131 is transmitted to the USB 231 through the data storage interface signal multiplexer 24 and the serial bus signal to storage interface signal controller 23, thereby being transmitted to the external device 30 so as to achieve the purpose of data reading. Furthermore, the data of the external device 30 can also be transmitted to the serial bus signal to storage interface signal controller 23 and the data storage interface signal multiplexer 24 through the USB 231, thereby being transmitted to the hard drive 131 so as to achieve the purpose of data saving.

The data access device 20 for using in the computer 10 of power off status of the embodiment is workable by utilizing the standby power provided by the power supply device 11.

Figure 3:
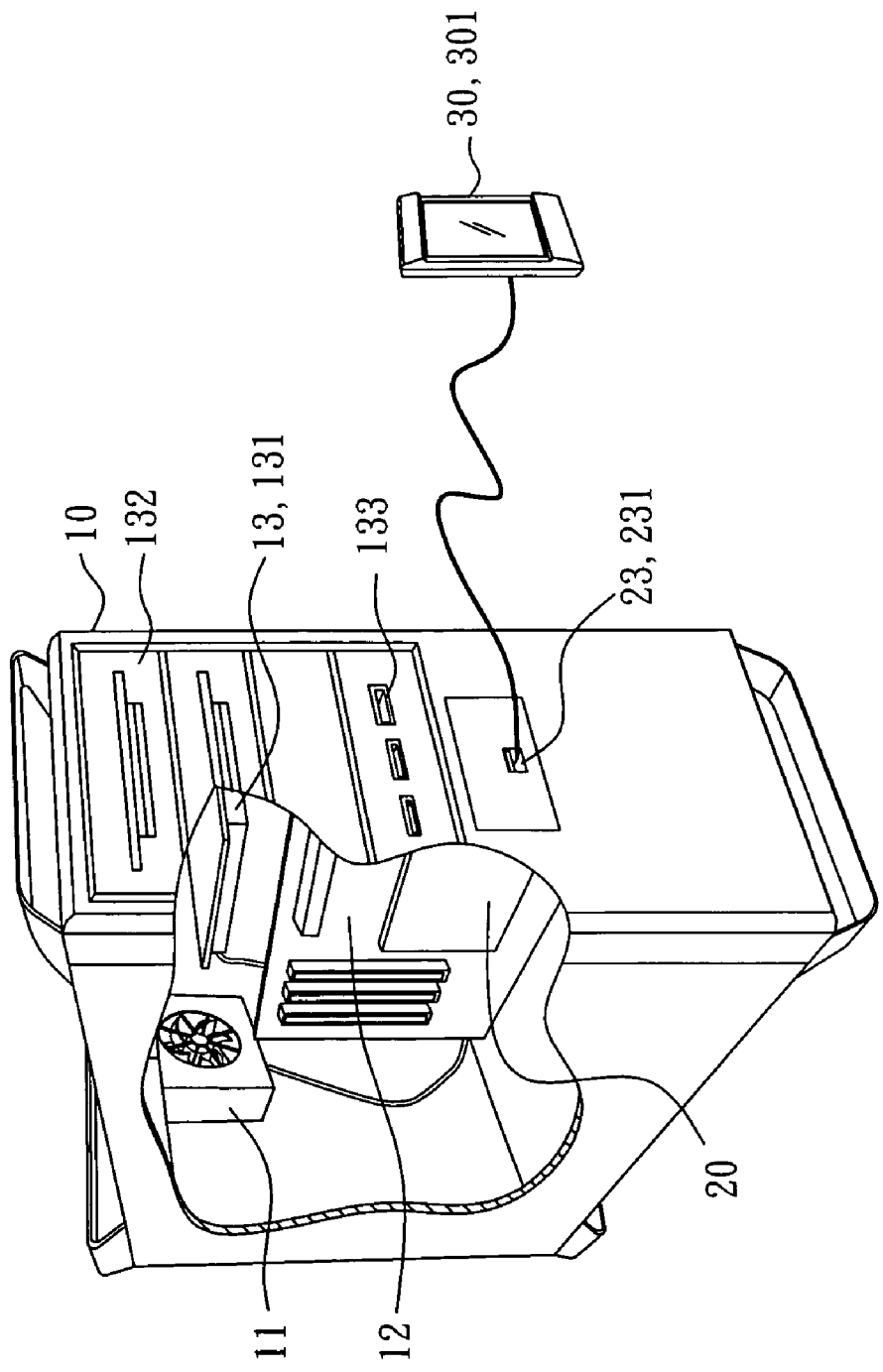
FIG. 3 illustrates a perspective view of another preferred embodiment according to the present invention.

Further, please refer to FIG. 3, the data access device 20 of the present invention can also be embedded in the motherboard 12. The function and purpose of this implementation is similar to the above embodiment, and this implementation further helps to increase the internal space of the computer case, and reduce the hardware cost.

According to the above description of the present invention, the external device 30 can access the data storage device 13 of the computer 10 when the computer is at power off, thereby not only saving the waiting time, but also reducing the unnecessary power consumption caused by activating all of the internal devices of the computer 10.

Although the present invention has been explained in relation to its preferred embodiment, it is to be understood that many other possible modifications and variations can be made without departing from the spirit and scope of the invention as hereinafter claimed.

What is claimed is:

1. A data access device for working with a computer, the computer having a power supply device, a motherboard, and a data storage device, the data access device being fixedly implemented between the power supply device and the motherboard and the data storage device in the computer and comprising:

a power multiplexer, connected between the power supply device and the data storage device for establishing power channels according to a control signal to supply power to the data storage device;

a DC to DC converter, connected to the power multiplexer for converting standby power provided by the power supply device and applying the converted power to the data storage device via the power multiplexer;

a serial bus signal to storage interface signal controller, for converting a storage interface signal of the data storage device into a serial bus signal, or converting the serial bus signal inputted from an external device into the storage interface signal of the data storage device;

a data storage interface signal multiplexer, for establishing a data transmitting channel according to the control signal, so as to select the motherboard or external device to access the data storage device; and a path controller electrically connected to the power supply device, the power multiplexer, the serial bus signal to storage interface signal controller, and the data storage interface signal multiplexer, the path controller is located within the data access device;

wherein, the path controller is based on a power good signal of the power supply device to determine whether the computer is at power on, and when the computer is at power off and the path controller detects that an external serial bus signal is inputted to the serial bus signal to storage interface signal controller, the path controller outputs the control signal to control the power multiplexer for providing the established power channels to supply power to the data storage device and to control the data storage interface signal multiplexer to switch the data transmitting channel.

2. The data access device as claimed in claim 1, further being embedded into the motherboard of the computer.

3. The data access device as claimed in claim 1, wherein the external serial bus signal is inputted by an external device.

4. The data access device as claimed in claim 3, wherein the external device is a digital device.

5. The data access device as claimed in claim 1, wherein the data storage device includes a hard disk drive.

6. The data access device as claimed in claim 1, wherein the data storage device includes a CD-ROM drive.

7. The data access device as claimed in claim 1, wherein the data storage device includes a flash memory.

8. The data access device as claimed in claim 1, wherein the serial bus signal to storage interface signal controller includes a serial bus.

9. The data access device as claimed in claim 1, wherein the storage interface signal of the data storage device includes an IDE interface signal.

10. The data access device as claimed in claim 1, wherein the storage interface signal of the data storage device includes a SCSI interface signal.

11. The data access device as claimed in claim 1, wherein the storage interface signal of the data storage device includes a Serial IDE interface signal.

12. The data access device as claimed in claim 1, wherein the storage interface signal of the data storage device includes a CompactFlash interface signal.

* * * * *